(12) United States Patent
Farnham

(10) Patent No.: US 9,327,372 B2
(45) Date of Patent: May 3, 2016

(54) CLAMP ROD ASSEMBLY

(76) Inventor: Timothy J. Farnham, East Amherst, NY (US)

(*) Notice: Subject to any disclaimer, the term of this patent is extended or adjusted under 35 U.S.C. 154(b) by 718 days.

(21) Appl. No.: 13/559,789

(22) Filed: Jul. 27, 2012

(65) Prior Publication Data
US 2013/0154173 A1 Jun. 20, 2013

Related U.S. Application Data

(60) Provisional application No. 61/522,026, filed on Aug. 10, 2011.

(51) Int. Cl.
B21D 51/26 (2006.01)
B23Q 3/00 (2006.01)

(52) U.S. Cl.
CPC .............. *B23Q 3/00* (2013.01); *B21D 51/2692* (2013.01)

(58) Field of Classification Search
CPC ... B23Q 7/1405; B07C 5/342; B21D 51/2615
USPC .......... 269/47, 56; 209/577; 413/69; 72/347, 72/350, 456, 94
See application file for complete search history.

(56) References Cited

U.S. PATENT DOCUMENTS

| 4,034,692 | A | 7/1977 | Hennes |
| 4,305,816 | A * | 12/1981 | Flood et al. ................... 209/549 |
| 4,732,031 | A | 3/1988 | Bulso |
| 4,881,394 | A | 11/1989 | Jansen |
| 5,018,379 | A | 5/1991 | Shirai |
| 5,050,417 | A | 9/1991 | Johnson |
| 5,061,140 | A | 10/1991 | Hamaguchi |
| 5,632,171 | A | 5/1997 | Kunka |
| 5,685,043 | A | 11/1997 | LaManna |
| 5,718,142 | A | 2/1998 | Ferraro |
| 6,199,420 | B1 | 3/2001 | Bartosch |
| 7,100,415 | B2 | 9/2006 | Takashima |
| 7,140,223 | B2 | 11/2006 | Chupak |
| 8,161,784 | B2 * | 4/2012 | Farnham ........................... 72/94 |
| 8,511,125 | B2 | 8/2013 | Reimer |
| 2004/0185337 | A1 | 9/2004 | Ishizaki |
| 2007/0284255 | A1 | 12/2007 | Gorokhovsky |
| 2009/0217729 | A1 | 9/2009 | Kojima |
| 2013/0205862 | A1 | 8/2013 | Takahashi |

FOREIGN PATENT DOCUMENTS

JP 05261449 10/1993

* cited by examiner

*Primary Examiner* — Lee D Wilson
*Assistant Examiner* — Jamal Daniel
(74) *Attorney, Agent, or Firm* — Jennifer Meredith, Esq.; Meredith & Keyhani, PLLC

(57) ABSTRACT

A clamp rod assembly apparatus, comprising: a cylindrical housing having a first end, a second end, and a raised cylindrical portion; a first round bushing having a longitudinal octagonal bore and received in the first end of the cylindrical housing; a second round bushing having a longitudinal octagonal bore and received in the second end of cylindrical housing; a ram having an attachment end portion and an octagonal shaft end portion which slides in the longitudinal octagonal bore of the first round bushing and the longitudinal octagonal bore of the second round bushing; a nose portion having a clamp pad stem, a nose piece, and a lock nut, the clamp pad stem threadably attached to the ram to allow the length of the clamp pad stem to be adjusted, and the nosepiece attached to the clamp pad stem.

21 Claims, 17 Drawing Sheets

FIG. 15

INTENTIONALLY LEFT BLANK

CLAMP ROD ASSEMBLY

This application claims priority to provisional patent application No. 61/522,026 filed Aug. 10, 2011 and entitled "CLAMP ROD SLIDE ASSEMBLY", the entire contents of which are incorporated herein by reference.

Beverages are commonly served in aluminum and metal cans which are made at the pace of more than one million per day. They are generally formed from two pieces: a top (which generally has a tab for opening the beverage) which is generally affixed to a bottom after it is filled with a liquid substance such as a beer or soda. It is desirable to make the can as thin as possible, to reduce material and shipping costs. However, the can itself has to be strong enough to withstand both internal and external pressures. To do so the cylinder section of the can has many curves in its top and bottom to make the can more rigid and able to withstand the internal and external pressures created by internal gases and external axel loads created by stacking and handling.

Today it is not just the quantity of cans needed but the quality as well, along with a thinner wall can that has to be handled with a little more precision than the thick can of the past. In the United States, production of aluminum beverage cans has reached about 100 billon/yr. The aluminum can replaces the steel beverage can so almost all beer cans are made of aluminum today as well as soda cans and other various food cans and cans such as cat food cans. The appeal to aluminum is its recyclability. Aluminum is called the endless can material in many cases. As we progressed out of the steel beverage can we realized that we could make cans out of more beneficial shapes to, for example, allow beer to be hot pasteurized in the can rather than before the can as we did before. This hot pasteurization caused a significant stress on the aluminum can in various ways that were all negative to the desired outcome. So the industry designed cans with new style dome bottoms that would take the additional pressure while maintaining the column strength, but this added new bends to the can that are problematic for pinholes during the ironing process of the cans or drawing out the aluminum cold to a thin walled can with very little imperfection. So today the cans are getting thinner and the test equipment has to be better and faster to meet the supply and demand.

Randolph and Alcoa Light testers, an example of which may be seen in prior art FIG. 1, FIG. 2, FIG. 3, FIG. 4, FIG. 5 and FIG. 6 and described in detail in U.S. Pat. No. 4,305,816. This type of light tester may be found all over the country on various machines at various plants in the United States. Each machine had very similar problems and these same problems can be found consistently in almost every facility with every light tester. The light tester is the last machine these cans go through before being sent out to the various fillers. By being able to create a better, more reliable device for the industry they will be able to have less down time and more production time, because a production line only runs as fast as the last machine can. The Light testers could run as fast as 2000 cans per minute (cpm) in the case of a LT 10 a ten pocket light tester and 2400 cpm in a LT 16 a sixteen pocket light tester's. The point being the industry could have less down time and prevent false rejects, spoilage and costly set up time for the correct "protrusion" the pressure setting on the cans between the clamp pad and the seal on the array head. But now they run only at 1800 to 2100 cpm due to deficiencies in the square clamp rod assembly causing costly down time and unneeded spoilage due to can rocking and false rejects. Less down time saves time and money by making changes to the device that holds and release's the cans at the exact moment needed and holding it tightly in between. The present invention is simple to install, set up and adjust. If there are any concerns it is not working properly it may be simply replaced. Also it is designed so that the repair is not necessary. People working in the maintenance workforce today in can plants will be able to just replace the square clamp rod assembly rather than trying to repair it. The abilities of the maintenance work force of today are more remove and replace rather than break down the units and attempt to repair them as compared to craftsmen who helped maintain these machines of the 1960 and 90's still in use today.

The leaders in the beverage can industry want simple and easy removal and replacement parts and this is where the trend is going. A quality part made that consists of high quality materials, machining standards and the best quality control removing any deficiencies before being put in production. The present invention implements these standards in the clamp rod assembly.

FIG. 5 depicts a Light tester used in the beverage can industry and is a mechanical device used to test extruded metal cans for pin holes after being extruded. This is done by pushing the open ended can opening against a round soft rubber seal that has a circular opening in the middle that exposes the face of the array head "as seen in FIG. 6 array (228) a device used to pick up the most miniscule amount of light and checking it in nana seconds for any pin holes in the can caused by either the extruding process or even by debris in the metals being extruded. By having fixed high intensity lights (252 and 254) surrounding the can as seen in FIG. 2 as it is being turned onto the secondary in feed wheel of the light tester for 180 degrees in any of the pocket positions 1 thru 16. A "LT16" meaning "light tester 16 pockets."

FIG. 7 depicts the environment in which the present invention is installed. With reference to FIG. 7, a clamp rod assembly is depicted as it may be used in a cam assembly of a light testing machine. The light testing machine may be a Randolph Light tester or Alcoa Light testers, an example of which may be seen in prior art FIG. 1, FIG. 2, FIG. 3, FIG. 4, FIG. 5 and FIG. 6 and described in detail in U.S. Pat. No. 4,305,816. The attachment end portion of the ram (not viewable as being under/in the cam shoe 1002) is attached to the rail groove (1004) of the world cam (1006). The apparatus (1000) is placed through a hole in the bottom clamp plate (1008) which is on a wheel (1012) and the slide assembly raised cylindrical portion (1010) is of a circumference larger than the hole in the bottom clamp plate (1008), making it easily insertable in a direction shown by arrow "A" and removable in the opposite direction. Note that FIG. 7 is only intended to show how the assembly fits into the larger machine and may not be to scale. A transfer disk holds the array head and seal. A clamp pad on one end pushing against the bottom end of the can while at the other end of the shaft there is a cam follower that rides in a rail (1004) of the world cam (1006) that has raised offsets making it move forward to pick up the can to test it. Then turning 180 degrees moving the ram backward to release the can to the discharge wheel (See FIG. 3, discharge wheel 58) to be sent on to palletizing or it gets rejected if the pocket has detected a light leak or a can rock light leak. A "can rock" is caused by inertia and the can being too loose between the seal and the clamp pad. The seal can cause the bottom of the can to rock or slide upwards due to the looseness of the can causing a false reject. The cans run about 1800 cans per minute or 1800 CPM though the LT10 light tester and 2,000 cpm though the LT16 machines.

The inventor of the within invention realized that the only way to stop can rock caused by a loose fit between the clamp pad and the seal was to shut the machine down and leave a couple dozen cans in the in-feed and remove the clamp pad and put in washer-like shims that are anywhere from 0.005 of an inch to 0.01 of an inch in between the end of the rampart and the back of the clamp pad. Then manually turning the in-feed wheel to see if the can was still too loose, too tight or just right about 2½ to 3 pounds per square inch. Sometimes this will take upward to 15 minutes or more per pocket to check. This causes down time which equals to $690 to $800 a minute. Realizing this, the inventor came up with the within invention. Accordingly, it is the object of the present invention to provide an easy to assembly that is simple to install, set up and adjust.

These and other features, aspects and advantages of the present invention will become better understood with reference to the following description and claims.

SUMMARY OF THE INVENTION

The present invention relates generally to clamp rod assemblies, and in particular to a clamp rod assembly for use in an apparatus for testing containers.

According to one embodiment, a clamp rod assembly apparatus, the apparatus comprising: a cylindrical housing, the cylindrical housing having a first end, a second end, and a raised cylindrical portion; a first round bushing having a longitudinal octagonal bore and received in the first end of the cylindrical housing; a second round bushing having a longitudinal octagonal bore and received in the second end of cylindrical housing; a ram having an attachment end portion and an octagonal shaft end portion which slides in the longitudinal octagonal bore of the first round bushing and the longitudinal octagonal bore of the second round bushing; a nose portion having a clamp pad stem, a nosepiece, and a lock nut, the clamp pad stem threadably attached to the ram to allow the length of the clamp pad stem to be adjusted, and the nosepiece removably attached to the clamp pad stem by a bolt These and other features, aspects and advantages of the present invention will become better understood with reference to the following description and claims.

BRIEF DESCRIPTION OF THE DRAWINGS

FIG. 14 depicts the present invention and FIG. 15 is left intentionally blank.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

With reference to FIGS. 8-13 and 15-21, a clamp rod assembly apparatus (2000) is depicted, the apparatus (2000) comprising a cylindrical housing (2003), the cylindrical housing (2003) having a first end (2004), a second end (2006), and a raised cylindrical portion (2008). The raised cylindrical portion is part of the slide assembly. There may be at least one circular groove (3010) in the outside of the cylindrical housing. The circular groove acts as a heat sink.

Figure 1:
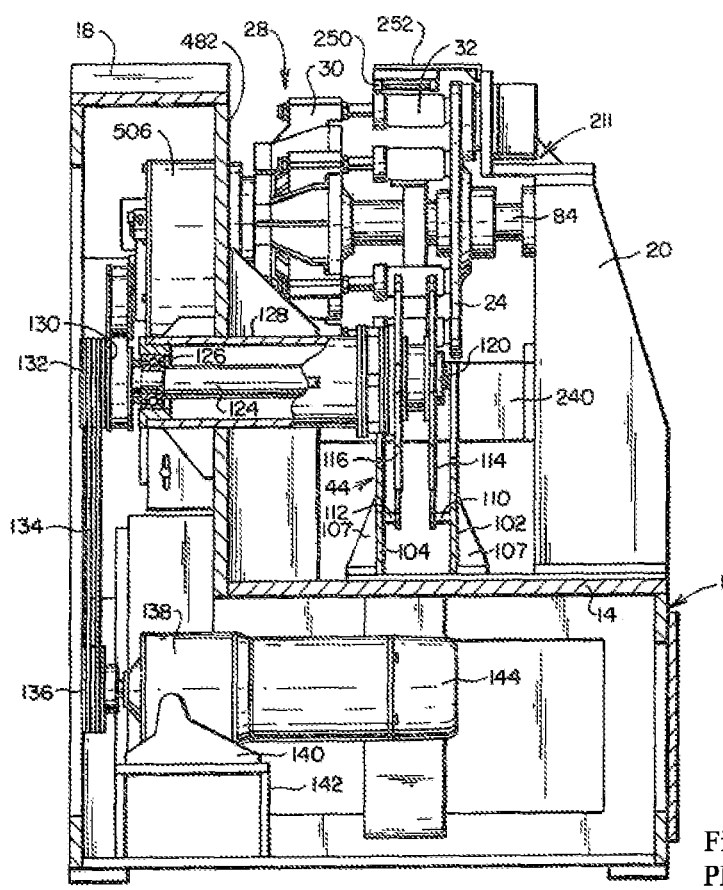
FIG. 1 depicts a prior art apparatus.
Figure 2:
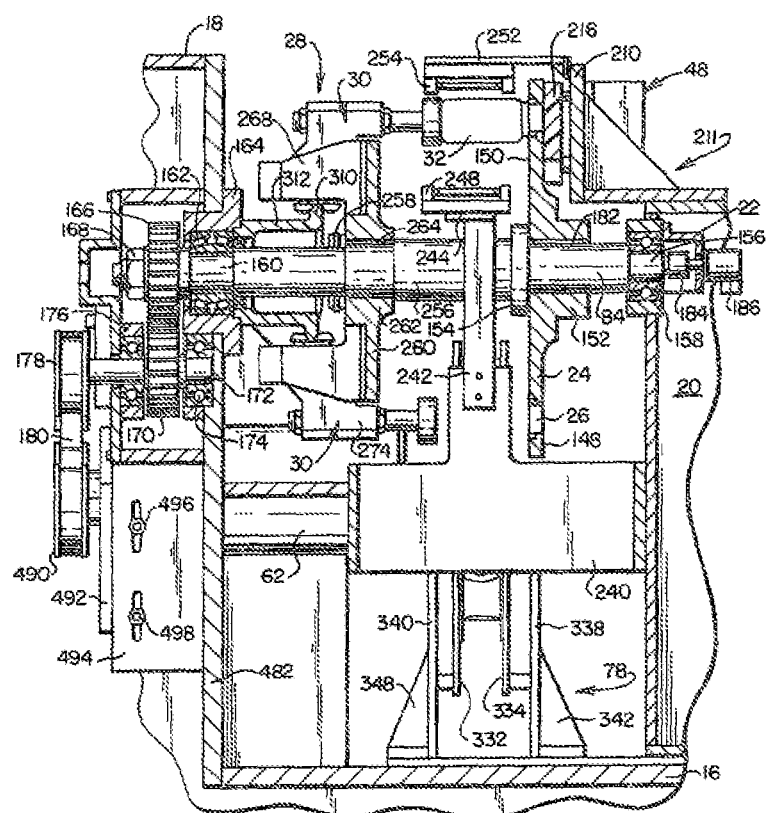
FIG. 2 depicts a prior art apparatus.
Figure 3:
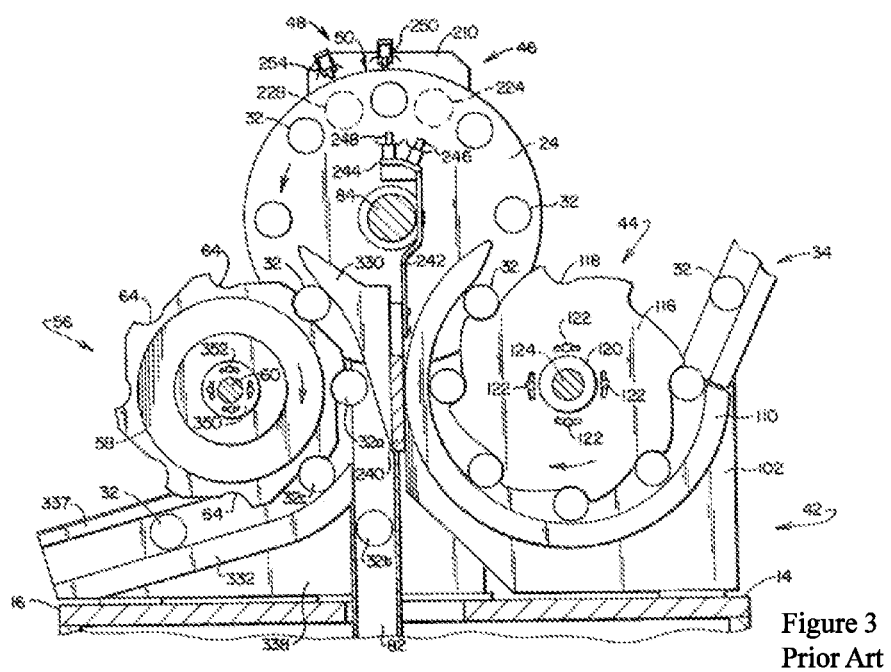
FIG. 3 depicts a prior art apparatus.
Figure 4:
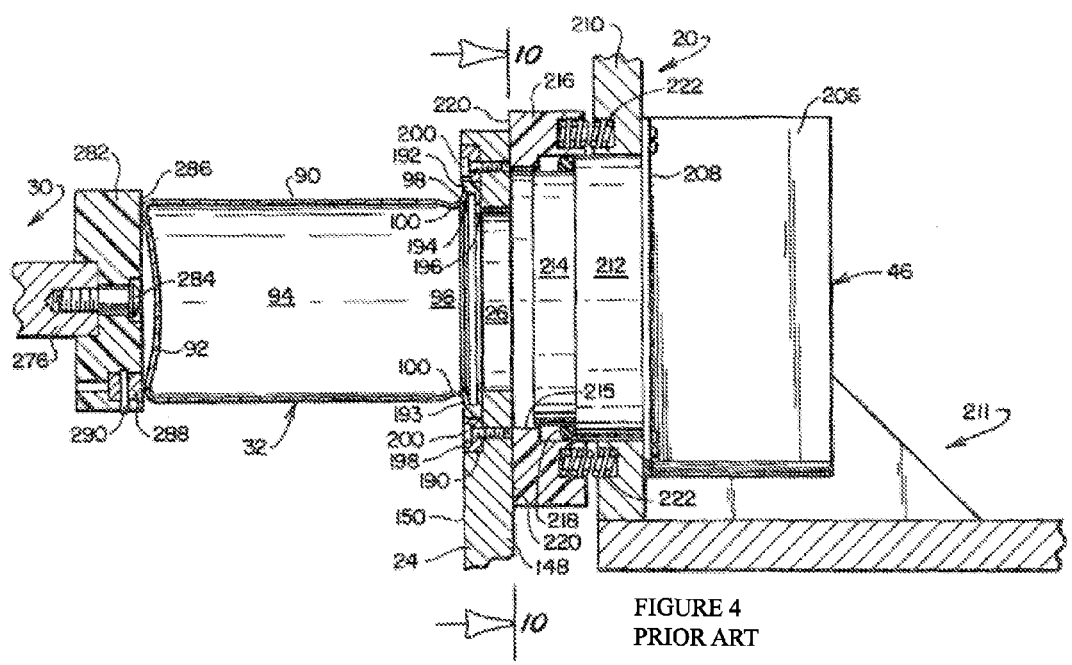
FIG. 4 depicts a prior art apparatus.
Figure 5:
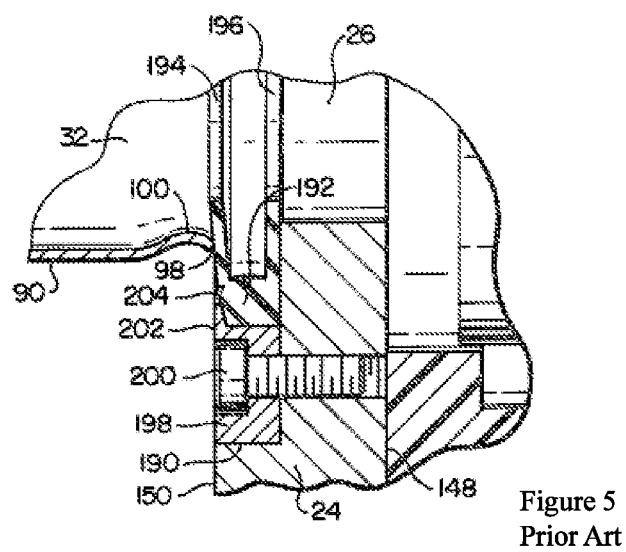
FIG. 5 depicts a prior art apparatus.
Figure 6:
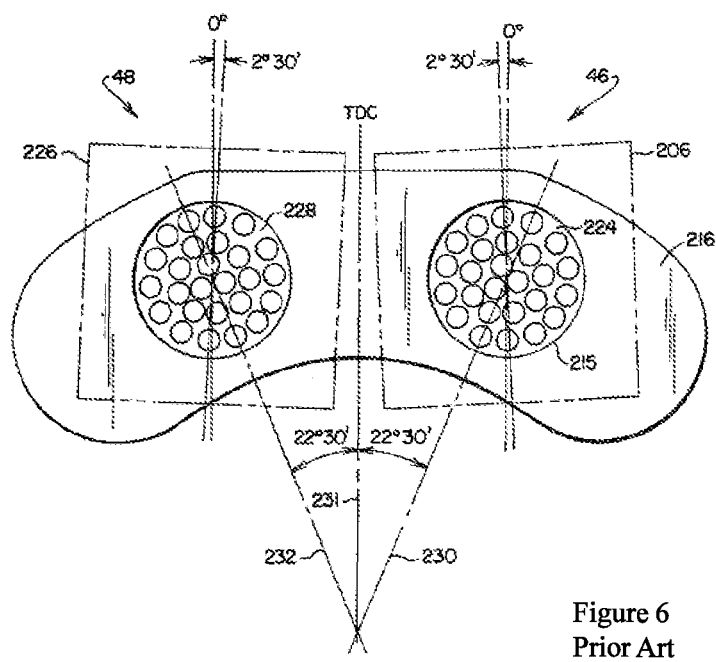
FIG. 6 depicts a prior art apparatus.
Figure 7:
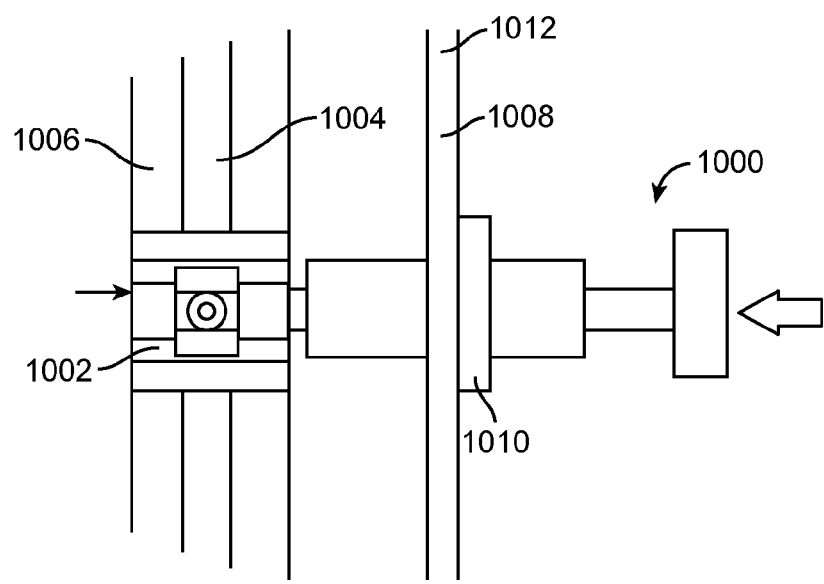
FIG. 7 depicts the present invention.
Figure 8:
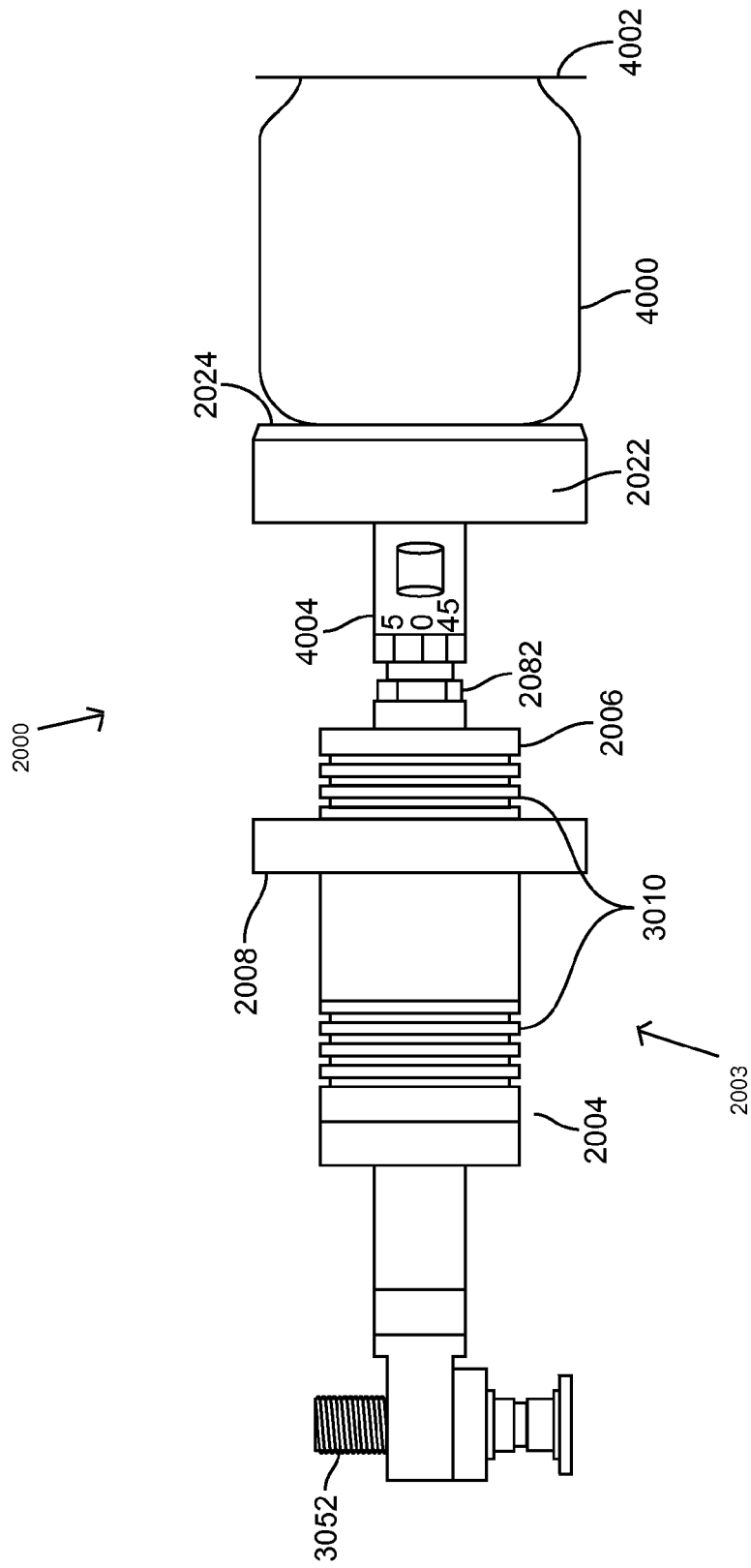
FIG. 8 depicts the present invention.
Figure 9:
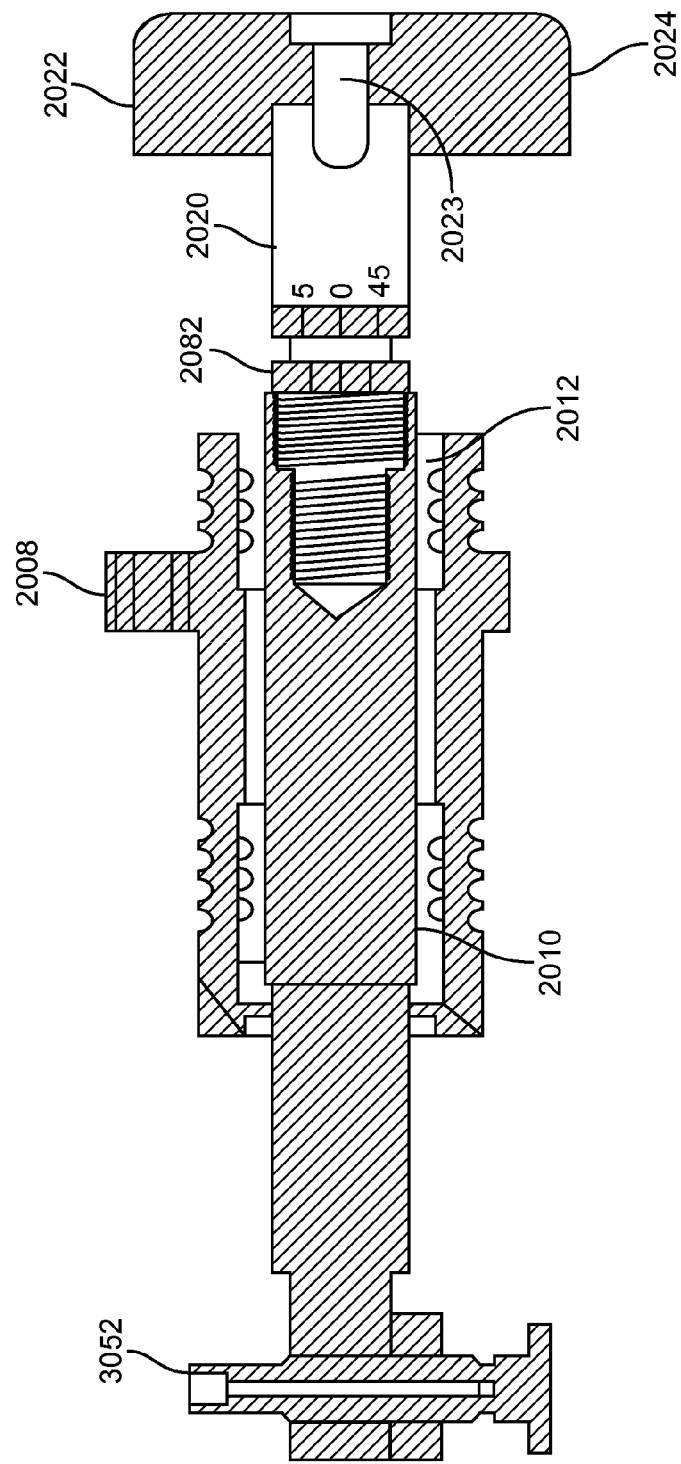
FIG. 9 depicts the present invention.

The outer surface of the cylindrical housing (2003) is exposed to air drag while the part turns at 180 to 240 RPM and the grooves (3010) act as heat sinks to help pull as much heat away from the bushings and the housing along with the ram. There may be a first round bushing (2010) having a longitudinal octagonal bore and received in the first end (2004) of the cylindrical housing (2003); a second round bushing (2012) having a longitudinal octagonal bore and received in the second end (2006) of the cylindrical housing. As can be seen the round bushing may or may not be flush with the end of the cylindrical housing. Also, one or both of the first round bushing and second round bushing may be integrally formed in and from the cylindrical housing. There is a ram (2018) having an attachment end portion (2014) and an octagonal shaft end portion (2016) which slides in the longitudinal octagonal bore of the first round bushing (2010) and the longitudinal octagonal bore of the second round bushing (2012). The attachment end portion (2014) of the ram (2018) may be attached to a cam shoe (1002) and a portion of a cam (1006) of a can assembly testing machine. There may be, for example, a longitudinal hole (3050) in the attachment end portion (2014) and a cam follower stem (3052), the cam follower stem (3052) being inside the longitudinal hole (3050) and attached to a cam stem follower (3051) which may be roller bearing and may be attached to a portion of a cam (not shown, see for example FIG. 7 (1004)). There may be a washer (3002) on the attachment end portion of the ram (2018) and a spring (3000), wherein the spring (3000) is interposed and surrounding the ram (2018) between the washer (3002) and the first end (2004) of the cylindrical housing (2003). The large diameter of the housing pushes inward as it is attached to the center wheel putting pressure on the roller bearing keeping it in tack with the oneside of the rail of the world cam groove. There may also be a spring between the ram and the nosepiece (2022). There may be a nose portion having a clamp pad stem (2020), a nose piece (2022), a clamp pad (2024), a bolt (2023) and a lock nut (2082), the clamp pad stem (2020) may be threadably attached to the ram (2018) to allow the length of the clamp pad stem (2020) to be adjusted. The term threadably attached may mean, for example, that on the end of the clamp pad stem (2020) there may a screw like protrusion with threads on it. There may be a mated threaded hole in the ram such that the clamp pad stem (2020) screws into the ram (2018). The clamp pad stem (2020) is threadably rotated to adjust the pressure between the clamp pad (2024) and a seal on an array head. Once the correct pressure is achieved there may be a turret lock nut (2082) between the clamp pad stem (2020) and the octagonal shaft end portion (2016), the turret lock nut (2082) may be screwed down to hold the position of the clamp pad stem (2020). The clamp pad (2024) may be removably attached to, or may be an integral portion of, the nosepiece (2022). This is to say that the clamp pad (2024) may be a separate piece or formed as a portion of the nosepiece (2022). The nosepiece (2022) is removably attached to the clamp pad stem (2020) by a bolt (2023). The threaded bolt (2023) may be an alien bolt and may extend through a center hole (2062) of the clamp pad (2024), a center hole of the nosepiece (2022) and be threadably attached to the clamp pad stem (2020). The clamp pad (2024) and the nosepiece (2022) may be made of a polycarbonate, clear acrylic, acrylic glass, acrylic resin or any transparent material. Acrylic resin is any of a group of related thermoplastic or thermosetting plastic substances derived from acrylic acid, methacrylic acid or other related compounds Acrylic glass is a generic term for poly(methyl methacrylate) (PMMA) hard clear plastic, commonly known by the brand names Plexiglas, Lucite, or Perspex.

The clamp pad may have at least one wear pin hole (2060) therein. The wear pin hole is a hole in the clamp pad which is filled with a metal, such as stainless steel, that has a scoured top surface. The scoured surface may be lines or a rough surface formed in the top surface of the metal.

Figure 14:
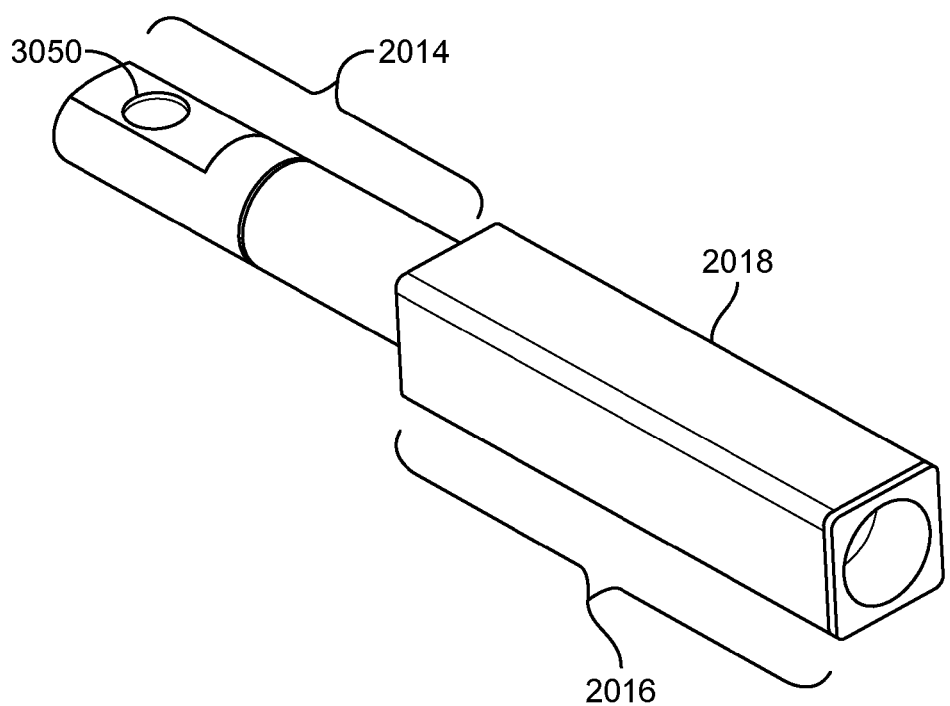
Figure 15:
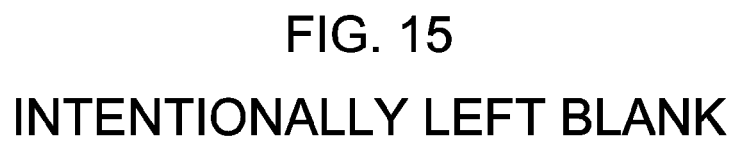

FIG. 14 depicts the octagonal shaft portion (2018) having four elongated sides. As can be seen, the octagonal shaft end portion (2018) is substantially one half of the length of the ram. FIG. 15 is left intentionally blank.

Figure 16:
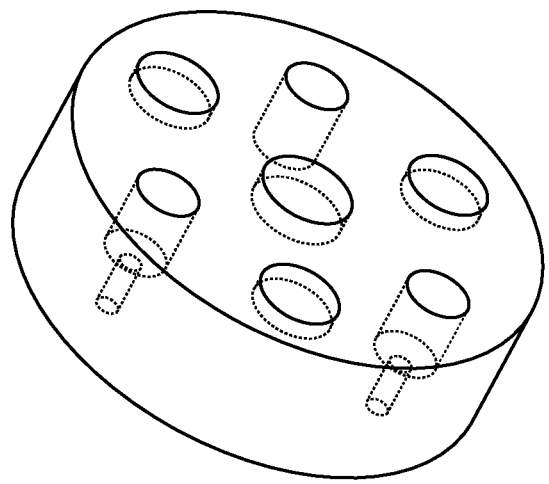
FIG. 16 depicts the present invention.
Figure 18:
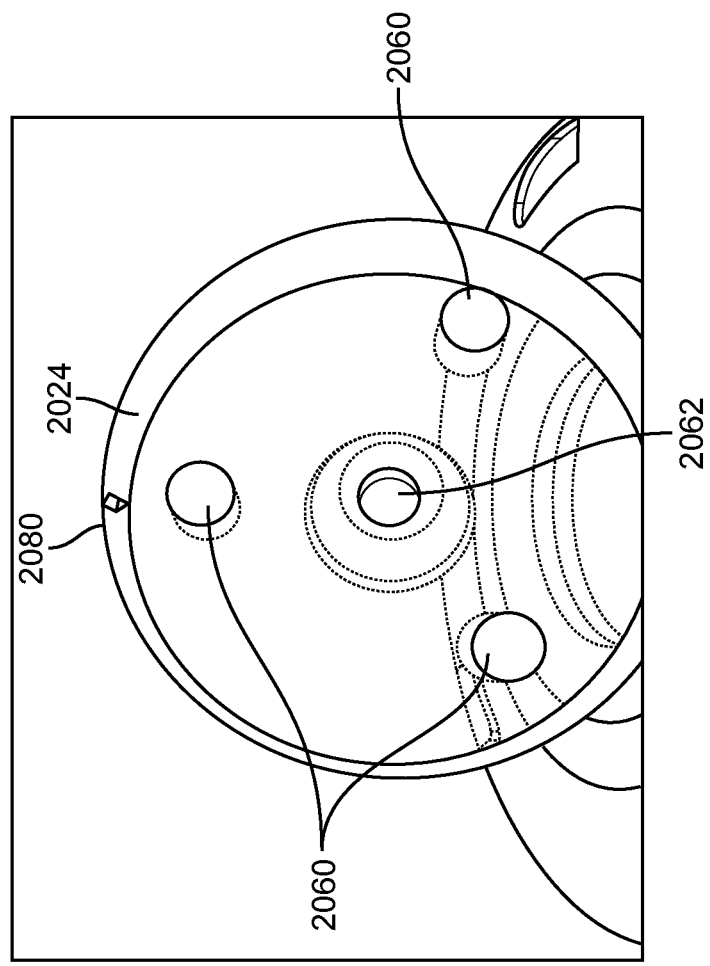
FIG. 18 depicts the present invention.

FIG. 16, depicts the clamp pad (2024) having at least one grip pad hole therein.

Figure 17:
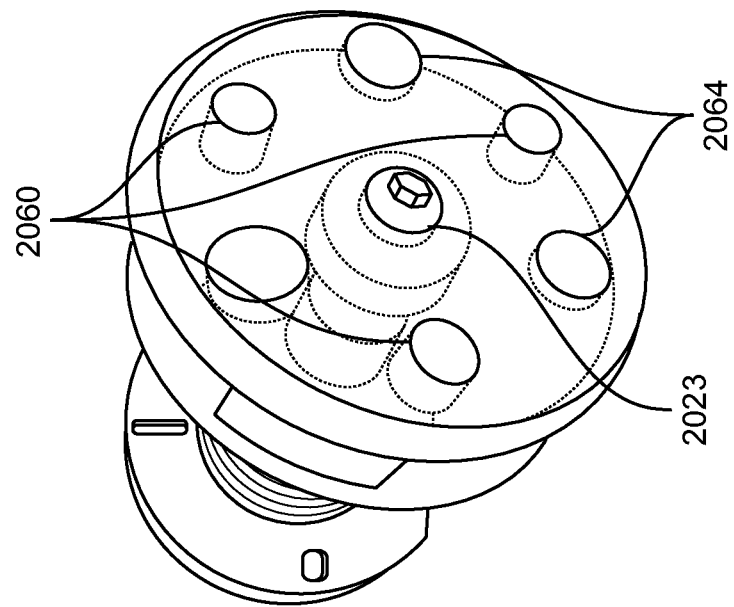
FIG. 17 depicts the present invention.
Figure 19:
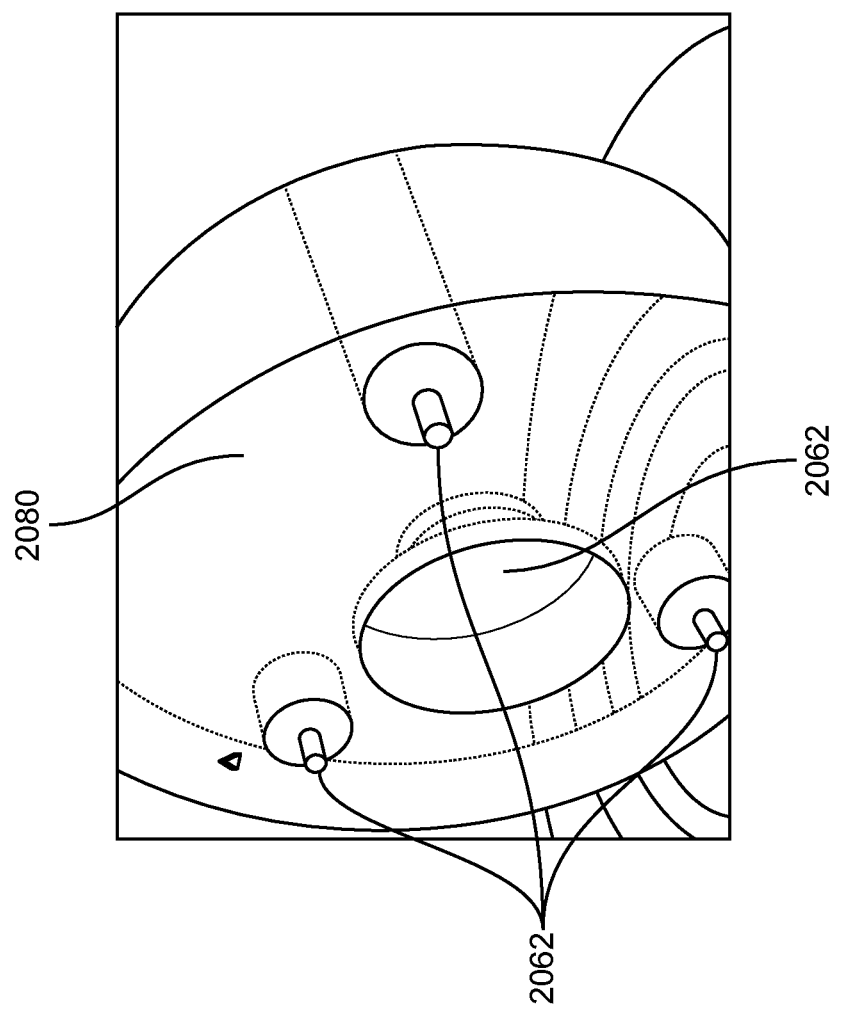
FIG. 19 depicts the present invention.

FIG. 17 depicts a top view of a clamp pad (2024) and FIG. 19 depicts a bottom view of the same clamp pad (2024). According the embodiment shown, there are three wear pin holes therein (2060) and three smaller breathe right holes (2062). The wear pin hole is filled with a metal having a scoured top surface and the smaller breather right hole under is under the metal having a scoured top surface. The breathe right holes (2062) prevent gas pockets from forming and expanding pushing the wear pins out causing "pin popping." There may also be an indicator sign (2080) on the clamp pad. The indicator sign may be of any shape desired, such as a line or an arrow as shown.

Figure 12:
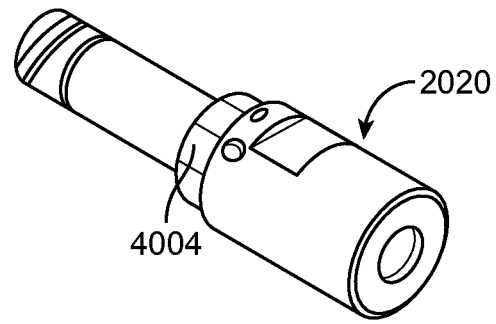
FIG. 12 depicts the present invention.
Figure 11:
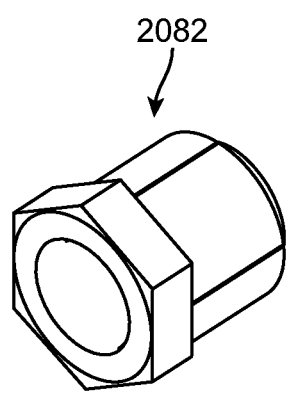
FIG. 11 depicts the present invention.
Figure 13:
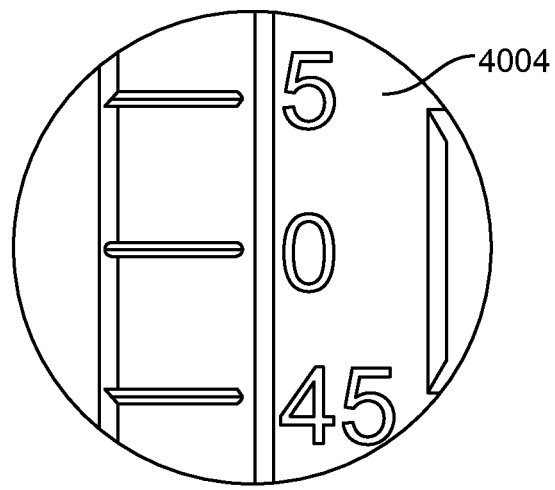
FIG. 13 depicts the present invention.

FIGS. 12 and 13 show the clamp pad stem (2020) marked according to the length of the clamp pad stem. This is to say, the markings correlate to how far in the clamp pad stem (2020) is threadably attached to the ram. This adjusts the pressure setting on the can (4000) between the clamp pad (2024) and the seal (4002) on the array head It is also useful for reference. For example, difference can sizes can be associated with the markings and the machinery easily switched for the new can size. The clamp pad stem (2020) may be marked in 0.005 thousands of an inch increment marks. Also, the nosepiece may be easily swapped out.

Figures 20, 21:
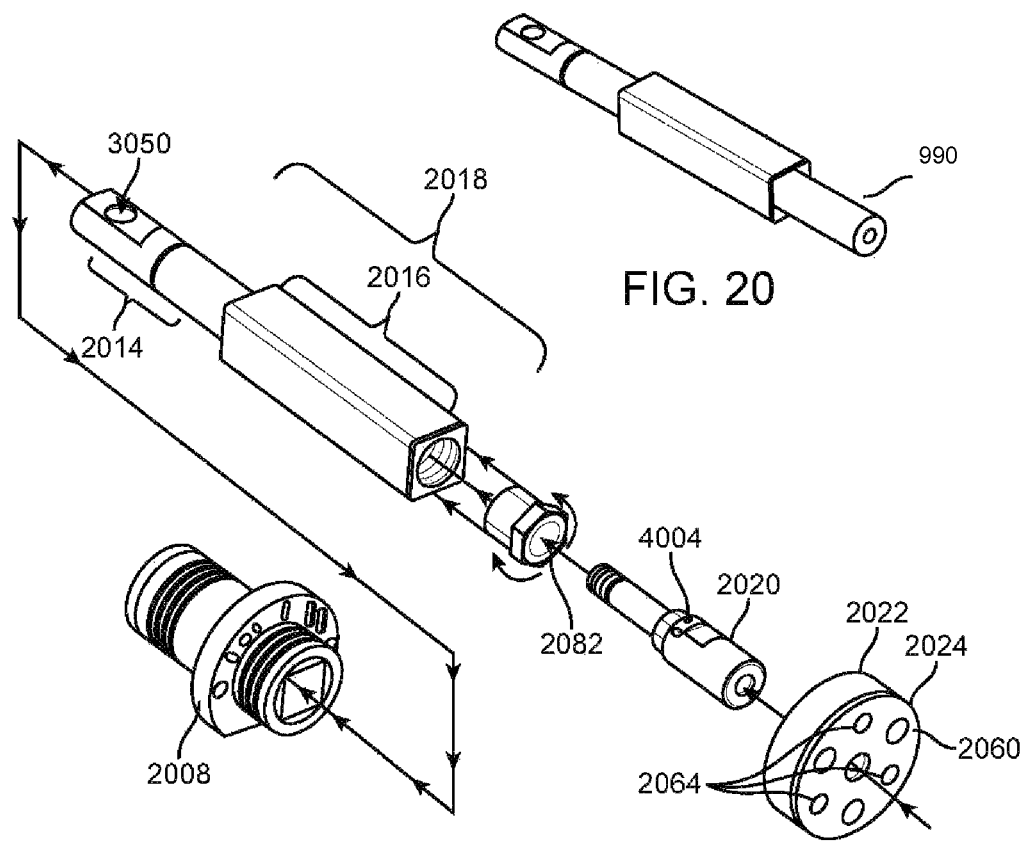
FIG. 20 depicts the present invention.
FIG. 21 depicts the present invention.

With reference to FIGS. 20 and 21, the design has a three piece ram displayed in FIG. 21. The ram (2018), the clamp pad stem (2020) portion of the nose piece and the turret lock nut (2082). The ram (2018) has an octagon section (2016) with four elongated sides that is made out of high speed tool steel hardened to 64 rock-well with a number 8 finish creating a lube less slide part of the ram that rides in the square opening of the lube less slide assembly parts first round bushing (2010) having a longitudinal octagonal bore and a second round bushing (2012) having a longitudinal octagonal bore in the bushing housing. The ram (2018) can have a vapor deposition micro coating on it to reduce the co-efficiency of friction, that takes the heat and punishment as it rides inside of the Bushings Parts (2010) an (2012) in the Bushing housing. The slide bushings, first round bushing (2010) having a longitudinal octagonal bore and a second round bushing (2012) having a longitudinal octagonal bore in the bushing housing, may be made, without limitation and by way of example, of a carbon resin and carbon resin and graphite material, as well as other materials. The clamp pad stem (2020) screws in and out of the ram (2018) after it goes though the turret lock nut (2082). To adjust pressure of the can the "protrusion" between clamp pad portion (2024) and the seal (4002) is to loosen the turret lock nut (2082) to loosen the nose part clamp pad stem (2020) to make it tighter or tighten the nose part clamp pad stem (2020) turning counter clock wise to make it looser. When you have just right pressure against the seal (4002) you simply tighten the turret lock nut (2082) and turn the clamp pad portion (2024) so that the indicator (2080) dot is up to the top and the procedure is done in less than 5 minutes saving lots of money in down time resetting seal pressures after changing seals and prevent less false rejects.

Another advancement in the art is to add to the incremental nose, as depicted in FIG. 12, incremental marks (4004) simplify and take the guess work out of adjusting the pressure against each can pocket more consonantly was to add 0.005 thousands of an inch increment marks on the nose so when adjusting the pressure between the seal (4002) and the clamp pad portion (2024). It can be done quickly and accurately between each pocket as it wears in and without having to use shims this allow the line mechanic to complete an adjustment in less than 25% of the time needed before. Again down time is money so the less you have of it the better off you are. By way of example, if you have to add 20thousands to pocket number one you can do it to all the pockets by simply reading the difference in measurement from the beginning to the end of the adjustment and apply the same distance to all without having to guess how far you turned the nose part clamp pad stem (2020) in or out.

Another factor that influences the fit of the can is the temperature of the rams, with most varying from 147 up to 200 degrees Fahrenheit caused by lack of lubrication. The use of lubrication is frowned upon due to contamination due to excess grease and/or oil, which does not meet with kosher standards in most cases. Even with lubrication the bushing material would fail and reduce the lifecycle of the clamp rod assembly and also unevenly wearing out the cam followers. These are all expensive fixes that also cause false rejects. The standard today has a bushing all the way through the bushing housing which causes flex in the housing. This was thought to be the best way to make the bushing housing a strong durable bushing and housing, but it is not. This creates a hot spot in the middle of the bushing and the housing where it can't cool down and cause it to retain a steady heat allowing the upward and side forces caused by the cam and the spring loaded cam follower to distort the aluminum housing. This distortion shows up on the clamp pad therefore effecting how the can fits uniformly between the seal and the pad. Having taken used housings and putting them in a chuck of a lathe I have seen with veneers and a surface gages you can easily see the amount of distortion up to 0.028 thousands of an inch and in between the top and the bottom.

In the past the shaft was on solid piece, see FIG. 20 part (990) that had a threaded hole at the end so they can bolt the clamp pad on. If the protrusion was not correct a number of round flat shims would be added between the end of the ram and the back of the clamp pad till the proper protrusion is achieved. Protrusion is the distance between the clamp pad and the seal saving down time and money.

Accordingly, the present invention provides ram assembly as depicted in FIG. 21. Having the ram (2018) and the nose part clamp pad stem (2020) separated by a turret lock nut (2082) making it a three piece ram connected by a deep female hole in the end of the shaft of the ram (2018) with a deep thread at the bottom and held tight and concentric by a turret lock nut (2082) that also is threaded into a wider shallow threaded hole in front of the first deep threaded hole in the end of the shaft of the ram (2018) as seen in FIG. 21. The hole that the turret lock nut (2082) goes into has a tapered seat that makes the turret lock nut tighten around the main stem of the nose part clamp pad stem (2020) when turret lock nut (2082) is turned clock wise. The clamp pad stem (2020) that holds the clamp pad portion (2024) has a long stem that has threading at the end that turns in and out to adjust protrusion you can quickly and more efficiently adjust the protrusion the distance between the clamp pad and the seal simply by loosening the turret lock nut (2082) turning it counter clock wise and the turning the nose part clamp pad stem (2020) counter clock wise to lengthen or clock wise to shorten and loosen protrusion which in turn changes the pressure on the cans open end against the array head seal (4002). According to the present invention, you can change over the machine to run a different size can simply by changing the nose part clamp pad stem (2020) and not having to purchase a whole new ram, as would be the case with prior art ram (990) as depicted in FIG. 20.

Having a removable nose section you can always use the same 1 inch thickness clamp pad (2024) therefore reducing the cost of the clamp pad (2024). Instead of custom built rams and clamp pads that are sometimes 6 inches thick. You only need to change the nose part clamp pad stem (2020) to the proper size.

By incorporating a spring between the ram (2018) and the nose part clamp pad stem (2020), without threads at the end, to accommodate a spring along with adding a stop on the long stem of the nose like a shoulder to catch on the threaded adjustment turret lock nut (2082) you can keep a constant pressure therefore rarely ever having to adjust the pressure of the can between the Clamp pad (2024) and the seal (4002) making an auto protrusion device. An example of a spring (3000) is depicted on FIG. 10 on the other side of the ram.

The material to make the nose part clamp pad stem (2020) is aluminum which is light weight and reducing the inertia to run it. Using the three piece Ram assembly allows various style noses (a nose being nose part clamp pad stem (2020) and the clamp pad portion (2024)) to be put on the end of the ram (2018). For example the 8½ oz can ram can't be made long enough to accommodate a 1 inch clamp pad due to the fact you could not assemble the slide housing and the ram as one piece together in the light tester due to various space limits. Now you can. You can now make a nose that will hold a 6 inch diameter can and one for a 6½ oz can. It increase's your variables. Using a turret lock nut (2082) to hold the nose tight into place is far better than a set screw or double nuts in between the nose and the ram due to the fact that a turret style lock nuts have been used in the machine industry because it hold the tool or in this case the nose tight and concentric. As cans get thinner we need more precise equipment to hold them.

The clamp pad portion (2024) having at least one wear pin hole filled with a metal (2060) having a scoured top surface and the clamp pad portion (2024) having at least one grip pad (2064) hole there in are very important advancements to the clamp pad. The clamp pad portion (2024) acts as a clear, hard matrix that holds the wear pins (2060) in place and the grip pad (2064) is also very important as it adds to the matrix of the clamp pad in various circular patterns as the wear pins (2060) for various size can diameters. Now that cans are being made thinner and will continue to be made even thinner than ever imagined. The grip pad (2064) may consist of two types of material a soft foam like substance and a hard machined rubber making part. The supple foam pad part gets recessed into the face of the clamp pad portion (2024). The special machined surface of this pad face that only sticks up a few thousand's of an inch above the clamp pad portion (2024) is capable of holding a can at almost half the pressure and prevents it from rocking the heavy end of the can out of place causing false rejects, bent flanges or allowing the can to move a cause for dents going into the discharge wheel. These soft pads allowing half the pressure to hold the can against the seal also doubles the life of the seal at the Array head and prevents can rock wear. This is very critical because it allows the tester operator to speed up the light testers by additional speed as little as 100 cpm up to 200 cpm "CPM" cans per minute and maybe more as we perfect it. All the novelties needed to do this are in the present invention and will be needed to hold the can with lighter pressure by using the coupled with the new soft touch pad.

The ram (2018), the first round bushing (2010) having a longitudinal octagonal bore and received in the first end (2004) of the cylindrical housing (2003), and the second round bushing (2012) having a longitudinal octagonal bore and received in the second end (2006) of the cylindrical housing are key components to making this a linear bearing for the Square clamp rod slide assembly. The ram (2018) is a design that is made of a harden tool steel of 62 rock well that has a number 8 finish on the four flats of the ram (2016) running them though the housing 2008 that has two bushings (2010 and 20102) made up of a carbon resin and or a carbon graphite resin The combination of the 62 rock well tool steel with a number 8 finish on the ram and the material and the resin in the bushing working against each other as it operates, creates a stable linear bearing that needs no grease or oil to run due to the low co-efficiency of friction. This combination will run for a very long time without a drop of oil or grease. In fact grease or oil will reduce the coefficiency of friction causing the life of the linear bearing to diminish and is never to be added. This system for a linear bearing that requires no oil or grease is stable enough without any other products added to the combination described above. This combination has run at 1042 strokes a minute with a 0.250 stroke in in house testing and has lasted over a year without failure and very limited wear detectable by micrometers. To help extend the life, protect from surface corrosion and reduce the coefficiency of friction a vapor deposition coating or molecular bombardment by a particle accelerator made up of a variety elements from the periodic table combined with gases such carbon dioxide, nitrogen, oxygen and argon and an element combination such as DLC, CCT, CrN, Cr+a-C:H:W or one of 85 coatings made up of various elements molecules put together that are bombarded on the part can been added in single or multiple layers. The enhanced tribological properties of the coating not only protect the components from wear but also polish the connecting parts during run in time reducing the friction between the two parts lowering co efficiency of friction. Lubrication of an oil or grease will never be needed making it a true lube-less linear bearing, which prevents grease mist and cross contamination from happening during testing in this application. This is a bearing without the need for oil or grease a discovery and one that the same technology can be applied basically any type of bearing not needing any type of lubricant to other bearings in of our life's and in the things we use every day.

Figure 10:
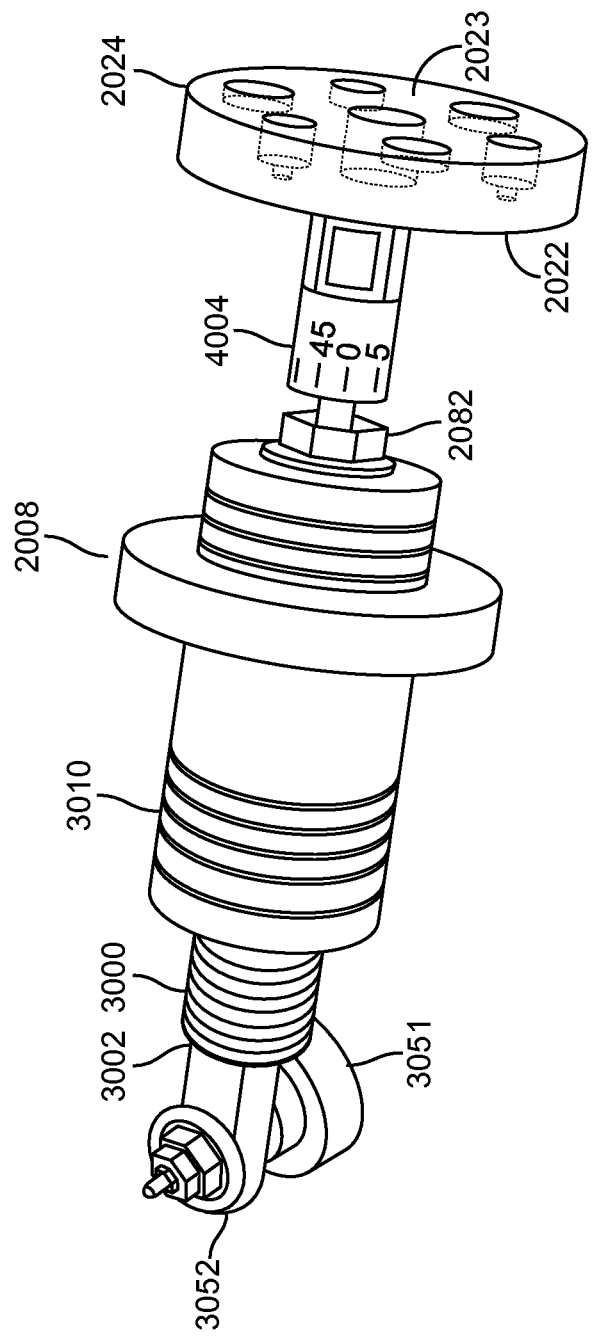
FIG. 10 depicts the present invention.

Another advancement to the bushing housing and excess heat in the bushing and distortion of the housing was to leave the maximum amount of the aluminum in the center of the housing making it more ridged at the key leverage point and making it a two piece bushing (2010 and 2012) and reducing the length of the clamp pad side housing to allow more room to accommodate the 24 oz adjustable nose this and reducing the diameter of the bushings (2010 and 2012). As shown in FIG. 10, cutting groves (3010) or heat sinks into the substantially left end of the outside of cylindrical housing (2003) and the substantially right end of the outside of cylindrical housing (2003). These outside sections of the housing are exposed to air drag while the part turns at 180 to 240 RPM and the grooves (3010) act as heat sinks to help pull as much heat away from the bushings and the housing along with the ram. These groves (3010) (or heat sinks) are directly around the bushing to maximize the heat being pulled away from the friction areas of the assembly. During tests we found that by adding air flow to these areas reduced the already low temperatures caused by friction of the dry lubricant less parts of 20 degrees Fahrenheit (F) allowing the part to run at 98 degree's F rather than standard 120 to 140 degree's F.

Some of the novelties of the present invention are: Two piece bushing (2010 and 2012) making the center of the cylindrical housing (2003) more ridged. Reducing the diameter of the bushings (2010 and 2012) to make more efficient in reducing stored heat which is caused by friction. Reducing the length of the clamp pad side of the housing allowing room for adjustable nose and allowing the same thickness of clamp pad to be used on all sizes of cans 24 oz 12 oz 8½ oz which reduces the cost of clamp pads because they will all use the same thickness Acrylic pads. Cutting in groves or heat sinks to pull the heat out of the friction areas of the bushings more efficiently rather than a smooth surface finish. This will increase the life of the assembly and help prevent Break down of the parts. The two piece bushing allows the thicker center of the housing preventing distortion of the housing itself and shows we can increase the operation speed of the machines without concerns of malfunction It should be understood that the foregoing relates to preferred embodiments of the invention and that modifications may be made without departing from the spirit and scope of the invention as set forth in the following claims.

I claim:

1. A clamp rod assembly apparatus, said apparatus comprising:
    a cylindrical housing, said cylindrical housing having a first end, a second end, and a raised cylindrical portion;
    a first round bushing having a longitudinal bore and received in said first end of said cylindrical housing;
    a second round bushing having a longitudinal bore and received in said second end of cylindrical housing;
    a ram having an attachment end portion and shaft end portion which slides in the longitudinal bore of the first round bushing and the longitudinal bore of the second round bushing;
    a nose portion having a clamp pad stem, a nosepiece, a bolt and a lock nut, the clamp pad stem threadably attached to the ram to allow the length of the clamp pad stem to be adjusted and secured by the lock nut, and the nosepiece removably attached to the clamp pad stem by a bolt.

2. An apparatus as in claim 1, wherein the nosepiece is further comprising a clamp pad portion removably attached to the nosepiece.

3. An apparatus as in claim 1, wherein the nosepiece is further comprising a clamp pad portion integrally formed as a portion of the nosepiece.

4. An apparatus as in claim 1, further comprising a clamp pad having at least one wear pin hole therein, said wear pin hole filled with a metal having a scoured top surface.

5. An apparatus as in claim 1, further comprising a clamp pad having at least one wear pin hole therein and at least one smaller breathe right hole, said wear pin hole filled with a metal having a scoured top surface and said smaller breather right hole under said metal having a scoured top surface.

6. An apparatus as in claim 1, further comprising a clamp pad having at least one grip pad hole therein.

7. An apparatus as in claim 1, wherein the attachment end portion of the ram is attached to a cam stem follower.

8. An apparatus as in claim 1, wherein said shaft end portion has four elongated sides.

9. An apparatus as in claim 8, wherein said four elongated sides of said are made of a harden tool steel of 62 rock well that has a number 8.

10. An apparatus as in claim 1, further comprising a spring between the ram and the nosepiece.

11. An apparatus as in claim 1, further comprising a washer on the attachment end portion of the ram and a spring, wherein the spring is interposed and surrounding the ram between the washer and the first end of the cylindrical housing.

12. An apparatus as in claim 1, wherein at least one of said first round bushing and said second round bushing is integrally formed from said cylindrical housing.

13. An apparatus as in claim 1, further comprising at least one circular groove in the outside of the cylindrical housing.

14. An apparatus as in claim 1, wherein said an shaft end portion is substantially one half of the length of the ram.

15. An apparatus as in claim 1, wherein said clamp pad stem is marked according to the length of the clamp pad stem.

16. An apparatus as in claim 1, wherein said clamp pad stem is marked according to the length of the clamp pad stem in 0.005 thousands of an inch increment marks.

17. An apparatus as in claim 1, wherein the lock nut extends through a center hole of the clamp pad, a center hole of the nosepiece and is threadably attached to the clamp pad stem.

18. An apparatus as in claim 1, wherein the attachment end portion has a longitudinal hole and a cam follower stem, the cam follower stem being inside the longitudinal hole and attached to a portion of a cam.

19. An apparatus as in claim 1, further comprising a clamp pad and an indicator sign on said clamp pad.

20. An apparatus as in claim 1, further comprising a turret lock nut between the clamp pad stem and the shaft end portion.

21. An apparatus as in claim 1, wherein said ram has a vapor deposition micro coating applied to the shaft end portion.

* * * * *